United States Patent [19]

Castillejos-Escobar et al.

[11] Patent Number: 6,159,436
[45] Date of Patent: Dec. 12, 2000

[54] CONVERSION PROCESS FOR STRONTIUM SULFATE IN CARBONATE RICH CELESTITE ORES TO STRONTIUM CARBONATE USING SODIUM CARBONATE IN AN AIR/VAPOR-LIFT LOOP REACTOR

[75] Inventors: Alfonso Humberto Castillejos-Escobar; Alejandro Uribe-Salas; Francisco Placido De La Cruz-Del Bosque; Francisco Raul Carrillo-Pedroza, all of Saltillo; Claudia Romero-Puente, Torreon; Jesus Emilio Camporredondo-Saucedo, Monclova, all of Mexico

[73] Assignee: Centro De Investigacion Y De Estudios Avanzados Del I.P.N., Zacatenco, Mexico

[21] Appl. No.: 08/751,735

[22] Filed: Nov. 18, 1996

[51] Int. Cl.[7] .................................................. C01F 11/18
[52] U.S. Cl. ............................. 423/155; 423/409; 423/431
[58] Field of Search ..................................... 423/155, 659, 423/431, DIG. 16, 409

[56] References Cited

U.S. PATENT DOCUMENTS

| | | | |
|---|---|---|---|
| 3,754,993 | 8/1973 | Oguchi et al. | 423/DIG. 16 |
| 4,666,688 | 5/1987 | De Buda | 423/431 |

FOREIGN PATENT DOCUMENTS

| | | | |
|---|---|---|---|
| 23055 | 2/1980 | Japan | 423/431 |
| 83934 | 5/1984 | Japan | 423/431 |
| 565877 | 8/1977 | U.S.S.R. | 423/431 |

*Primary Examiner*—Wayne Langel
*Attorney, Agent, or Firm*—Breiner & Breiner

[57] ABSTRACT

This invention relates to a low energy hydrometallurgical process for the production of strontium carbonate of chemical and glass grade from carbonate rich celestite ores typically having around 28% combined strontianite, calcite, dolomite and other carbonates. This process avoids negative environmental impact usually associated to calcining technology and involves fewer processing stages than prior art hydrometallurgical processes. Thus, in two stages which provide: (1) the acid wash of the celestite ore in an acid medium to eliminate carbonates present other than strontium carbonates and (2) the conversion of the thus enriched celestite to strontium carbonate in an air/vapor-lift loop reactor using a sodium carbonate aqueous medium, a step permitting recovery of sodium sulfate as a by-product. Thus, an almost complete conversion of the strontium sulfate present in the enriched ore is achieved.

2 Claims, No Drawings

CONVERSION PROCESS FOR STRONTIUM SULFATE IN CARBONATE RICH CELESTITE ORES TO STRONTIUM CARBONATE USING SODIUM CARBONATE IN AN AIR/VAPOR-LIFT LOOP REACTOR

BACKGROUND OF THE INVENTION

The mineral celestite contains strontium sulfate ($SrSO_4$) which is the main source for the production of strontium carbonate, from which other strontium chemicals are obtained, e.g., strontium nitrate, strontium chloride, strontium hydroxide, etc. The major use of strontium carbonate is in the manufacturing of color television picture tubes, which contain about 5% to 7% of strontium oxide (supplied as $SrCO_3$). The second and third major applications of the strontium carbonate are in the manufacture of ceramic ferrite magnets and in the purification of the zinc electrolite for the electrolytic production of zinc. Strontium carbonate is also employed as an ingredient of certain ceramics used for china and electrical glazes. The second most important strontium compound, obtained from the strontium carbonate, is the nitrate which is used in the fabrication of military and civilian signal flares and in pyrotecnics. Other strontium compounds which have less demand are strontium chromate, strontium phosphate and strontium chloride which are used as constituents of pigments, fluorescent lights and tooth pastes, respectively. As technology needs grow, it is expected that the application for strontium containing materials will increase, thus demanding a more efficient use of lower grade mineral resources through processes that meet quality demands and impose a negative impact on the enviroment.

The most common commercial process for producing strontium carbonate from celestite ores is the "black ash" process in which the celestite concentrate is calcined at elevated temperature, about 1000 degrees Centigrade, with finely ground carbon to produce strontium sulfide (SrS), carbon dioxide ($CO_2$) and carbon monoxide (CO). The strontium sulfide is later leached with hot water and separated from solid impurities by filtration. The dissolved strontium sulfide is reacted with sodium carbonate, carbon dioxide or both to precipitate the strontium carbonate. Eventhough the calcining process is the most widely used, it has the disadvantages of (1) producing substantial amounts of strontium carbonate during calcining (which are lost as insolubles later during the leaching stage), (2) being energy intensive and (3) producing undesirable polluting by-products such as sodium sulfide ($Na_2S$, produced when sodium carbonate is employed as the carbonating compound) or hydrogen sulfide ($H_2S$, produced when carbon dioxide is used as the carbonate source).

Alternatively, strontium carbonate can be produced directly in a metathesis reaction by digesting relatively high grade celestite ore with soda ash solutions at low temperatures. Although simpler than the black ash process, the one stage direct conversion method has two main drawbacks: long periods of time are required in order for the reaction to be completed and little purification takes place so high purity products can not be obtained if low and medium grade celestite ores or concentrates are used. When high purity strontium carbonate (greater than 98.4%) is needed, the crude strontium carbonate obtained should be subjected to additional purification steps. The purification may consist of calcining the carbonate at about 1400 degrees Centigrade to obtain strontium oxide; the oxide is dissolved in water to produce $SR(OH)_2$ and the filtered solution reacted with $CO_2$ gas to precipitate strontium carbonate of higher purity. Another method of purification consists of dissolving the strontium carbonate in an HCl solution; after the solution of the carbonates is completed the pH of the liquor is neutralized to cause the precipitation of the Fe impurities and remove them by filtration, together with the insoluble silica. The strontium present in the solution as $SrCl_2$ can then be recovered by a second precipitation with soda ash.

SUMMARY OF THE INVENTION

The process of this invention overcomes several disadvantages of the prior art processes. It avoids the pollution by undesirable by-products, the high energy consumption and the problems associated with the natural occurrence of strontium carbonate in the ore or concentrate or formed during calcining that the black ash process has. Also, this process does not require additional refining steps of the strontium carbonate produced during the conversion of strontium sulfate as is the case with the the exclusively hydrometallurgical processes reported to date. The process of this invention is especially suited for ores containing as main contaminants carbonates such as strontianite ($SrCO_3$), calcite ($CaCO_3$) and dolomite ($CaMg(CO_3)_2$ and much lower amounts (less than 2.5% total) of hematite ($Fe_2O_3$), barite ($BaSO_4$), silica ($SiO_2$), fluorite ($CaF_2$) and other minerals species. Ores with this mineral composition are ubiquitous within the Mexican territory. In the process of this invention the wash of the mineral with hydrochloric acid under appropriate conditions, regarding acid concentration and particle size, results in an upgraded ore containing mainly celestite and strontianite (greater than 98.5% combined). In the process of this invention this said resulting mineral is directly converted to strontium carbonate of glass grade (greater than 98.4% strontium carbonate) by direct leaching with a sodium carbonate solution. To ensure this said composition of the strontium carbonate product the process of this invention promotes the almost complete conversion of the celestite (greater than 98.8%) to strontium carbonate by carrying out the conversion in an air/vapor-lift loop reactor under appropriate conditions of sodium carbonate concentration, solution temperature, solution pH, pulp percentage, mineral particle size and pulp agitation.

Thus, a purpose of the present invention is to provide an economical route of producing strontium carbonate meeting glass grade specifications through a two stage process, from which a valuable sodium sulphate by-product is also obtained.

In accordance with the present invention, strontium carbonate of glass grade can be prepared from celestite ores or concentrates with the following typical main composition: greater than 70% $SrSO_4$, less than 25% $SrCO_3$, less than 25 $CaCO_3$, less than 5% $CaMg(CO_3)_2$, and less than 2.5% of impurities such as $Fe_2O_3$, $BaSO_4$ and others. The said process involves the following two steps:

1) The removal of calcium carbonate, dolomite, hematite and other extraneous mineral species from a finely divided ore by treating it in a hydrochloric acid medium, of a concentration that removes the least possible quantity of the strontium carbonate naturally occurring in the ore or concentrate;

2) The conversion of the celestite present in the washed mineral through direct leaching with a sodium carbonate solution using a lift loop reactor where air and steam are injected; the air provides vigorous mixing of the solution as well as complete suspension of the particles, and the steam heats up the solution up to the desired reaction temperature. These said conditions, vigorous mixing, particle suspension and temperature, as well as sodium carbonate concentration, pulp percentage and solution pH are selected so as to ensure that the conversion of strontium sulfate to strontium carbonate is almost completed in 5 to 6 hours, so that the solid product contains strontium carbonate in excess of 98.4% at the end of the reaction period. This said concentration meets the specifications of glass grade strontium carbonate. After separation of the solid product, the sodium sulphate present in the conversion liquor is recovered by crystalization.

THE PREFERRED EMBODIMENT

The process of the present invention converts acid wash pretreated celestite ores or concentrates to strontium carbonate of glass grade by direct leaching with a sodium carbonate solution in an air/vapor-lift loop reactor. The stoichiometry of the relevant chemical reaction is as follows:

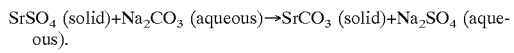

$SrSO_4$ (solid)+$Na_2CO_3$ (aqueous)→$SrCO_3$ (solid)+$Na_2SO_4$ (aqueous).

The pre-treatment stage by which the celestite ore or concentrate is upgraded consists in dissolving preferentially the celestite gange formed by extraneous carbonates and iron oxide in a diluted hydrochloric acid solution. These said extraneous carbonates are non-strontium carbonates, the lower solubility of the strontium carbonate in relation to the other soluble carbonate species permits keeping a good portion of the strontium carbonates in the resulting upgraded concentrate. The elimination of a high proportion of the soluble mineral gangue calls for a high degree of liberation of the gangue and therefore previous to the acid wash the ore is ground to below 70 microns. The acid wash stage is carried out in a mechanically or pneumatically agitated tank making use of a solution with a hydrochloric acid concentration slightly in excess of the stoichiometric required for the dissolution of the extraneous carbonate gangue material. The amount of ore or concentrate treated in a single batch may vary from 30 to 60% of the pulp weight depending on the mixing capabilities of the reactor. If pneumatic agitation in an air-lift loop reactor is used, pulps containing up to 60% solids by weight can be easily handled. Under these conditions, dissolution of the carbonaceous and ferrous gangue, mainly calcite, dolomite, magnesite and iron oxides and hydroxides, is completed in a short period of time, of the order of minutes. The said acid concentration and a short treatment time avoids an overdissolution of the strontium carbonate naturally occurring in the celestite ore or concentrate.

After the acid wash the upgraded concentrate is separated from solution by sedimentation or other separation technique. The liquor is transferred to an evaporator for recovering a calcium chloride rich solid and regenerating process water. The strontium sulfate enriched concentrate is washed with fresh water before being fed to the air/vapor-lift loop reactor for conversion to strontium carbonate using a sodium carbonate aqueous medium.

Many Mexican ores contain calcium and strontium carbonates as main impurities and they are found in similar proportions and adding up to around 30%. Under conditions where large quantities of the strontium carbonate go into solution together with the calcium carbonate during the hydrochloric acid wash of the ore or concentrate, the mixture of strontium and calcium chlorides can be refined by first crystallizing them. Then, this said mixture of chlorides in solid form is redissolved in water, after which the insolubles are separated and nitric acid is added to precipitate strontium nitride while leaving calcium chloride in solution. Thus the presence of strontium carbonate which imposes problems or is wasted in the calcining route is an advantage in the process of the present invention.

Those trained in the art of direct hydrometallurgical conversion of celestite should appreciate that the kinetics of its conversion to strontium carbonate is strongly enhanced in the present invention by providing conditions that ensure a vigorous mixing of the sodium carbonate solution, a complete suspension of the mineral particles and a solution temperature between 90 to 95 degrees Centigrade. In the present invention, these objectives are accomplished through the use of an air/vapor-lift loop reactor, of proper geometrical characteristics and operating parameters. In this reactor air is blown with a superficial velocity that guarantees a good mixing of the sodium carbonate in the solution as well as a complete suspension of the particles in the solution. Steam is injected intermittently together with the air to heat up the solution up to the above specified temperature range. The bubbling of air and steam is accomplished through a nozzle, porous plug or any other gas bubbling device located at the apex of the conical bottom of the reactor. Thus, the upgraded celestite concentrate is leached in the said reactor using a sodium carbonate solution. The amount of mineral treated is such as to have a mineral/leaching-solution pulp containing between 25 to 40 weight percentage of solids. The initial concentration of sodium carbonate in the solution is between 10 to 20% in excess with respect to the stoichiometric requirements for the conversion of the strontium sulfate present in the acid wash concentrate. These said concentrations of sodium carbonate favor a fast kinetics of the reaction and a large degree of conversion of the celestite. The pH of the solution in this said process is kept above 11 to minimize the consumption of the sodium carbonate reactant. The strontium carbonate so produced is separated from the spent leaching liquor by any of the usual solid-liquid separation techniques, washed with process water and dried by any of the conventional available methods and its composition meets glass grade specifications for strontium carbonate.

The spent leaching liquor containing sodium sulphate and non-reacted sodium carbonate in an approximately 7/1 weight ratio is subjected to fractional crystallization by cooling the said solution to 18 degrees Centigrade to precipitate deca-hydrated sodium sulfate $Na_2SO_4.10\ H_2O$ and leaving a sodium sulfate-sodium carbonate saturated solution containing about equal parts of both said chemical species. The crystallized solid, that accounts for the 59% by weight of the spent solution, is separated from the saturated solution by any of the usual solid-liquid separation techniques. The saturated solution resulting from the solid-liquid separation, that accounts for the remaining 41% by weight of the spent solution, is reconditioned by diluting every part of the solution with 4 parts of fresh water and reconditioning it with soda ash for recycling to the celestite leaching stage.

The process of the present invention produces strontium carbonate of glass grade directly from the conversion of the acid washed celestite ore or concentrate with sodium carbonate solution. The small number of steps involved in this said process constitutes an advantage over other hydrometallurgical based processes which normally require the dissolution of the strontium carbonate produced in an earlier conversion stage and its later re-precipitation; these additional stages have the purpose of eliminating insoluble barite, remaining iron oxides from a first wash, unconverted celestite and barium carbonate. In the process of the present invention these additional stages are not required because with the ores dealt with in this said invention the impurities are mainly found as carbonates and therefore are eliminated by the hydrochloric acid wash carried out previous to the conversion stage and also, very importantly, because the conversion is carried out to such an extent that almost no celestite remains unreacted.

We claim:

1. The process of preparing strontium carbonate of glass grade from celestite ores or concentrates including strontium carbonate, extraneous carbonates and iron oxide, comprising the steps of:

washing the celestite ore or concentrate in a hydrochloric acid bath for a time period preserving most of the strontium carbonate originally present in the celestite ore or concentrate and dissolving most of the extraneous carbonates and iron oxide, removing a slurry from the washed celestite ore or concentrate, converting the slurry by vigorously mixing an aqueous solution of sodium carbonate with the slurry until more that 99.7% of the strontium sulfate present in the slurry is converted to strontium carbonate, and redissolving in water both calcium and strontium chlorides formed during the wash step with water, and recovering strontium nitride by addition of nitric acid.

2. The process of preparing strontium carbonate of glass grade from celestite ores or concentrates including strontium carbonate, extraneous carbonates and iron oxide, comprising the steps of:

washing the celestite ore or concentrate in a hydrochloric acid bath for a time period preserving most of the strontium carbonate originally present in the celestite ore or concentrate and dissolving most of the extraneous carbonates and iron oxide, removing a slurry from the washed celestite ore or concentrate, converting the slurry by vigorously mixing an aqueous solution of sodium carbonate with the slurry until more than 99.7% of the strontium sulfate present in the slurry is converted to strontium carbonate, and maintaining a temperature between 90 and 95 degrees Centigrade in the converting step by injection of steam, and providing an initial concentration of sodium carbonate in the solution between 10% and 20% in excess of the stoichiometric requirements for the conversion of the strontium sulfate present in the acid wash concentrate.

* * * * *